July 23, 1946.  O. W. LIVINGSTON  2,404,643
ELECTRONIC ELECTRORESPONSIVE APPARATUS
Filed March 20, 1943  2 Sheets-Sheet 1
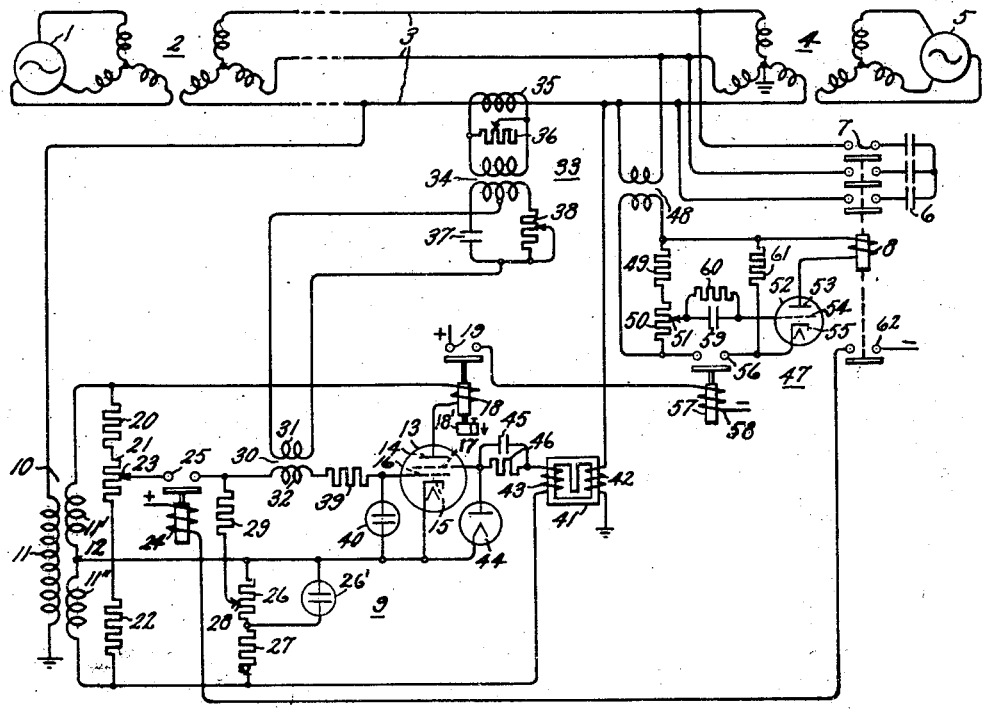
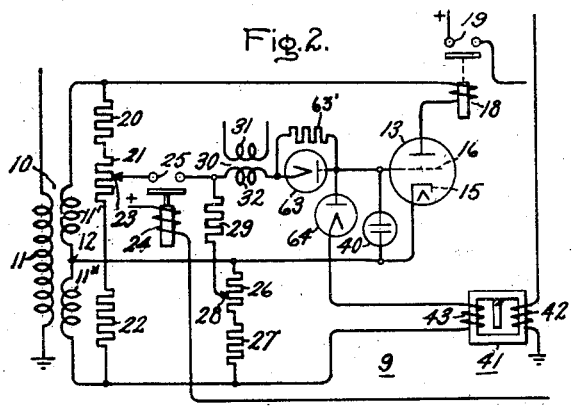
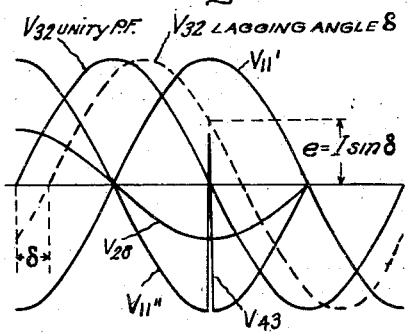
Inventor:
Orrin W. Livingston,
by Harry E. Dunham
His Attorney.

Patented July 23, 1946

2,404,643

UNITED STATES PATENT OFFICE 2,404,643

ELECTRONIC ELECTRORESPONSIVE APPARATUS

Orrin W. Livingston, Scotia, N. Y., assignor to General Electric Company, a corporation of New York Application March 20, 1943, Serial No. 479,921

25 Claims. (Cl. 250—27)

My invention relates to electronic electroresponsive apparatus and more particularly to a generalized form of an electronic relay utilizing an electron tube of the gaseous or vapor type provided with a control electrode, or electrodes.

The high speed of response, the relatively low signal voltage required for operation, amplifying ability and general versatility of electronic apparatus in relaying and control devices is now generally recognized in industry. Many different types of electronic relays and control devices have been proposed or used heretofore, but many of these devices generally, without the use of an inordinate amount of apparatus, do not possess all that is desired in sensitivity, accuracy, linearity of response, and adaptability for various purposes, particularly when required for operation in response to two co-existing electric quantities such as the current and voltage of an electric circuit.

It is an object of my invention to provide a new and improved electronic electroresponsive apparatus which possesses the above-mentioned desired operating characteristics coupled with simplicity and reliability in operation.

It is another object of my invention to provide a new and improved electronic relay or control apparatus which in its generalized form is adapted to provide a response in accordance with various functions of current or voltage, or various phase relations between two co-existing electric quantities such as the current and voltage of an electric circuit.

It is another object of my invention to provide a new and improved electronic electroresponsive device which provides a response in accordance with the magnitude and phase of a given electrical quantity with respect to a second given electrical quantity.

It is a further object of my invention to provide a new and improved electronic electroresponsive device which may be adapted to operate as a reactive current relay, a power relay, a reverse power relay, or a power factor relay.

My invention will be better understood from the following description taken in connection with the accompanying drawings, and its scope will be pointed out in the appended claims.

Figure 4:
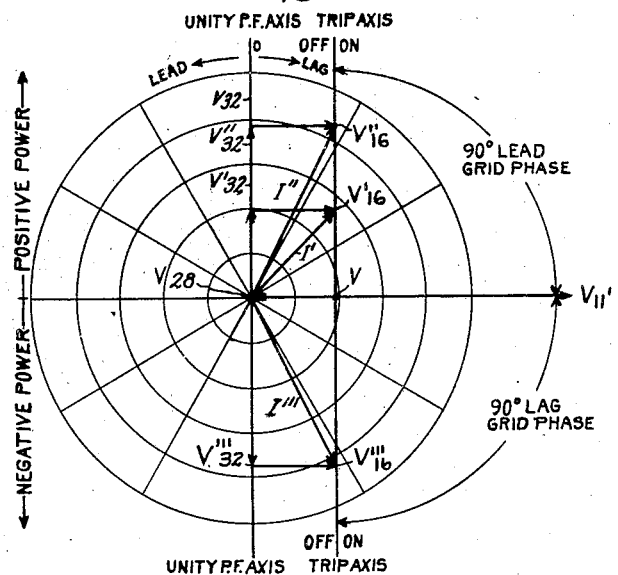
Figure 5:
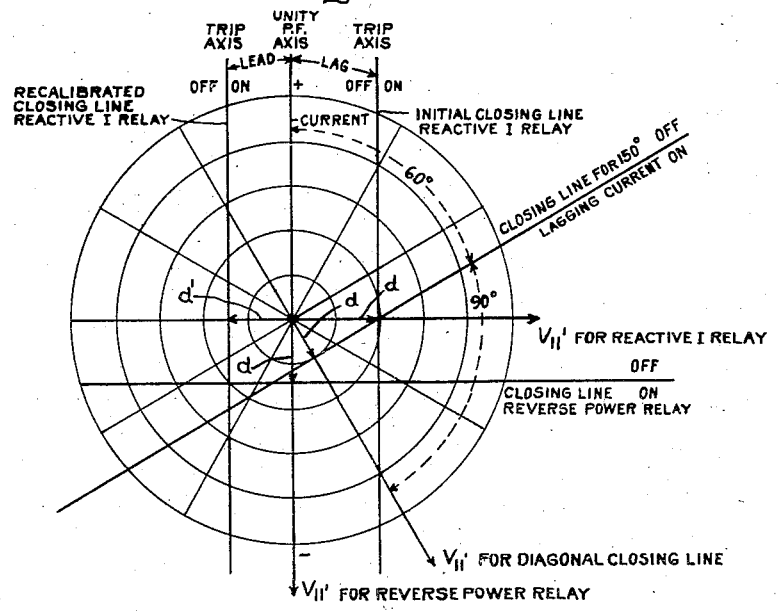

In the drawings, Fig. 1 is a diagrammatic illustration of an embodiment of my invention utilizing a multi-grid electron tube; Fig. 2 is a modification of the embodiment of my invention illustrated in Fig. 1; Fig. 3 is an explanatory diagram showing the relation between the several voltages of the elements of the electron tube, and Figs. 4 and 5 are explanatory diagrams of my invention.

In Fig. 1 of the drawings, I have shown one embodiment of my invention adapted for use in an electrical system for automatically correcting the power factor of a system by the use of phase modifying means. While the general features of this system which are helpful in understanding some of the aspects of my electronic electroresponsive apparatus are described herein, I have described and claimed certain aspects and various modifications of the system in my application Serial No. 479,922 filed concurrently herewith and assigned to the assignee of the present application.

Referring to Fig. 1 of the drawings, I have shown an electric distribution system comprising a three-phase alternating current generator 1, feeding a step-up transformer 2 which in turn is connected to supply electric energy to a three phase distribution circuit 3. The distribution circuit 3 supplies energy through a step-down transformer 4 to a load circuit indicated by the dynamo-electric machine 5. It will be presumed that the load circuit 5 draws a variable lagging reactive current and that it is desirable to add compensating leading reactive current when the lagging current of the load exceeds a predetermined value. For this purpose a polyphase connected bank of capacitors 6 is arranged to be connected to the circuit 3 by circuit interrupting means 7 having an operating coil 8.

For controlling the operation of coil 8 in the desired manner, I provide an electronic electroresponsive means 9 which is illustrative of one embodiment of my invention adapted to cause energization of coil 8 at a definite adjustable lagging reactive ampere load imposed on the circuit 3. A component of voltage proportional to the phase voltage of circuit 3 is obtained through a transformer 10 having a primary winding 11 connected between one phase conductor of circuit 3 and the neutral terminal or conductor thereof which is indicated, for purposes of simplicity, as a ground connection, and a secondary winding comprising two winding sections 11' and 11" provided with a tap 12 of intermediate potential which, for example, may be the electrical midpoint although in certain applications a different intermediate potential may be desirable. For effecting the desired response, I provide an electron tube 13, preferably of the gaseous or vapor type, which is provided with an anode 14, a cathode 15, a control electrode or grid 16 and a shield grid 17. The anode-cathode circuit of the tube 13 is connected to be energized from the secondary winding section 11' of the transformer 10 so that the anode 14 is connected to the upper terminal of 11' and the cathode is connected to the intermediate tap 12. The current traversing the anode-cathode circuit of tube 13 is arranged to control the energization of a control means illustrated as an electroresponsive device 18 and having contacts 19. The electroresponsive device 18 may be provided with time delay opening means shown as a dashpot 18' for certain operating conditions to be explained later. A resistance network or voltage divider comprising three resistance elements 20, 21 and 22 is connected in series relation across both sections 11' and 11'' of the secondary winding of transformer 10. Resistance element 21 is preferably provided with an adjustable connection 23 which under certain conditions, to be explained later, is connected to the control electrode 16 through a relay means 24 having normally open contacts 25.

Normally, an adjustable component of voltage 180° out of phase with the anode voltage of tube 13 is impressed on the control electrode 16, which, as illustrated, may be obtained from the secondary winding of transformer 10 by means of a voltage divider comprising resistance elements 26 and 27 connected in series relation across the winding section 11''. Resistance element 26 is provided with an adjustable connection 28 which is connected through a resistance element 29 to a point in the excitation circuit of control electrode 16 beyond the normally open contacts 25 of relay 24. In some applications it may be found desirable to correct for any voltage variations which may be impressed across the resistance element 26 of voltage divider 26—27 and in order to effect this correction, I connect a regulating device, such as a glow tube 26', across the resistance element 26. The glow tube 26' should have a minimum value of voltage thereacross when in a conducting state which is greater than the maximum amplitude of the minimum value of the component voltage from the connection 28. Since the adjustment of the connection 28 of resistance 26 determines generally the calibration of the electronic relay with respect to the value of reactive amperes at which response is effected, the use of this voltage regulating means will be determined by the extent of voltage variations experienced or expected in a given application. In addition, a second component of voltage is introduced in the excitation circuit of control electrode 16 which is arranged to be variable in accordance with the current in the appropriate phase conductor of the circuit 3. This second component of voltage may be introduced, as illustrated, through a transformer 30 having a primary winding 31 and a secondary winding 32. The secondary winding 32 is connected in series relation with the excitation circuit of control electrode 16 at such a point as to be included in the excitation circuit irrespective of the operation of relay 24. The primary winding 31 of transformer 30 is connected to be energized through a suitable phase shift means 33 arranged to be energized from a transformer 34 which, in turn, is connected to be energized from a current transformer 35 associated with the appropriate phase conductor of circuit 3. An adjustable resistance 36 may be connected across the output winding of current transformer 35 for determining the magnitude of the component of control voltage corresponding to the line current. The phase shifting means 33 may be of any suitable type and, as illustrated, may be of the impedance network type comprising a capacitor 37 and an adjustable resistor 38 connected across the output winding of transformer 34. The terminals of the primary winding 31 of transformer 30 may then be connected, respectively, to the common connection of capacitor 37 and resistor 38 and to the midpoint of the secondary winding of transformer 34. It will, of course, occur to those skilled in the art that a phase shifting circuit as a separate means may not be necessary for a particular application when it is possible to select the desired phase relation between line voltage and the component of voltage corresponding to the line current. In a three phase circuit as illustrated, it is well known that if line-to-line voltage is taken as the voltage component of the circuit, a current from the remaining line naturally has a 90° relation at unity power factor relative to the line-to-line voltage, and such an arrangement may be used in carrying out my invention when the relay is to operate solely as a reactive current relay. A current limiting resistor 39 may be connected in the excitation circuit of electrode 16 and a voltage limiting and protective glow lamp 40 may be connected between the electrode 16 and cathode 15.

The shield grid 17 is also energized with two components of voltage, one of which is derived from section 11'' of transformer 10 and the other of which is a voltage component of peaked wave form derived from the same phase voltage of circuit 3 as is impressed on transformer 10. A suitable means for producing this peaked component of voltage is a peaking transformer 41 having a primary winding 42 connected to be energized with the same phase voltage as transformer 10, and a secondary winding 43 connected in series relation with the excitation circuit of shield grid 17. Although the instant of the voltage peak from transformer 43 is illustrated and described as being at the 90° point of the anode-cathode voltage, it may be arranged, if desired, at any preselected point by proper selection of the phase of the voltage source or by suitable phase shifting means as will occur to those skilled in the art without departing from my invention in its broader aspects. For example, an advance of the peak will cause current conduction for a greater period of each forward half cycle of tube 13, whereas a retardation of the peak will cause current conduction for a shorter period of such forward half cycle. The adjustment of the instant of the peak may be utilized to obtain the same adjustment as is effected by the phase shifting means 33. With some types of electron tubes utilized for tube 13, it may be desirable to connect a unidirectional conducting device, such as a two-element vacuum tube 44, between the screen grid and its cathode 15. With this type of shield grid excitation, it may be desirable to supply a small amount of rectified bias from a capacitor 45 and a parallel connected resistor 46 in order to insure that tube 13 "fires" only at the 90° point or the preselected point and then only if the control grid potential is of the proper magnitude and phase.

For the particular application illustrated, in order to avoid too frequent operation of the switching mechanism it may not be satisfactory to energize winding 8 immediately upon establishing current flow in the anode-cathode circuit of tube 13. Consequently, a time delay apparatus 47 is interposed between the operation of relay 18 and the energization of winding 8.

There are various types of time delay apparatus that would be suitable, such as well known thermal, mechanical or electronic time delay apparatus. A particularly satisfactory time delay apparatus is of the electronic type such as is described and claimed in United States Letters Patent No. 2,171,347 to E. D. Schneider, granted August 29, 1939, and assigned to the assignee of the present application. In the form, as illustrated, I provide a source of voltage from the circuit 3 by means of transformer 48. A voltage divider comprising two resistance elements 49 and 50 is connected across the secondary winding of transformer 48. Resistance 50 is preferably made adjustable and provided with an adjustable contact 51. An electron tube 52 having an anode 53, a control grid 54 and a cathode 55 is arranged to be energized from the transformer 48. The cathode 55 is connected directly to one terminal of the transformer secondary through the contacts 56 of switching means 57. An operating coil 58 is provided for switching means 57 and is connected in a control circuit indicated by the + and − signs to be energized when contacts 19 of relay 18 are closed. The anode of tube 52 is connected through the winding 8 of the capacitor circuit interrupting means 7 to the other terminal of transformer 48. The grid 54 of tube 53 is connected to the adjustable contact 51 through a capacitor 59, which capacitor is shunted by a resistor 60 forming a leakage path through which the capacitor may lose its charge at a predetermined rate. The cathode 55 in addition to its connection to the bottom terminal of the secondary winding of transformer 48 is also connected to the top terminal of the same secondary winding through a relatively low resistance 61.

The circuit interrupting means 7 is provided with auxiliary contacts 62 which are included in a control circuit energized from the control bus indicated by + and − signs to energize relay 24 which is employed to impress a different component of voltage on control grid 16 of tube 13 and thereby recalibrate the electronic electroresponsive device 9 upon closure of circuit interrupting means 7 and cause conduction of tube 13 for a different phase relation of the current of circuit 3.

The time delay means 18', previously referred to, prevents "pumping" as contrasted with the function of the time delay means 47 which is to prevent too frequent operation of the capacitor circuit interrupting means. The time delay means 18' is so adjusted that the recalibration by relay 24 is always effected by the time the circuit interrupting means actually connects the capacitors 6 to circuit 3.

In Fig. 2, I have shown an embodiment of my invention utilizing an electron tube of the gaseous or vapor type utilizing a single control electrode or grid. In this case, both the current and voltage signal from circuit 3 are combined on the same grid 16 by interposing series diodes in the respective control circuits which provide the respective signals. As illustrated, a two-element electron tube 63 is connected with its anode toward the grid 15 in series relation with the current signal from transformer 32 and a second two-element electron tube 64 is connected with its anode toward grid 16 in series relation with the peaked voltage signal from transformer 41. In this way, the electron tube 13 will be automatically and instantaneously connected to whichever grid source is most negative. Thus a grid voltage, more negative than the critical grid voltage, from either source will prevent conduction of the tube 13 giving the same type of operation as that obtained with the two-grid arrangement illustrated in Fig. 1. With certain types of gaseous tubes utilized to perform the functions of tube 13, it may be desirable to use a relatively high resistance 63' in shunt to the diode tube 63. This resistance may be of the order of 5 to 10 megohms so as to permit a slight grid current to flow and thereby assist in the initiation of the firing of tube 13 of a type having a positive or relatively high critical starting characteristic.

The operation of the embodiments of my invention illustrated in Figs. 1 and 2 may be more readily understood by reference to Fig. 3 in which the voltage relations in the circuit are illustrated. One component of voltage $V_{11''}$ impressed on shield grid 17 is obtained from winding section 11'' which is 180° lagging with respect to the voltage $V_{11'}$ impressed upon the anode-cathode circuit of tube 13. The peaking voltage $V_{43}$ derived from transformer winding 43 is also impressed on shield grid 17 and is of the phase and magnitude indicated. The shield grid potential is thus the resultant of $V_{11''}$ and $V_{43}$. The rectified bias from capacitor 45 insures that tube 13 will "fire" only at the 90° point of the anode voltage wave or such other selected point determined by the peak $V_{43}$ if the control grid is energized sufficiently to effect "firing" at this point. That is, the negative self bias from capacitor 45 prevents the possibility of any false firing at the beginning or end of the cycle where the value of $V_{11''}$ is rather small.

The resultant potential of control grid 16 is the sum of the 180° out of phase component of voltage between the secondary intermediate point 12 and adjustable tap 28 indicated as $V_{28}$, and the component of voltage $V_{32}$ from transformer secondary 32 derived from the line current transformer 35 through the phase shift means 33. For the purpose of measuring reactive amperes, the phase shift means 33 is adjusted to give a 90° relation between the current in the phase conductor of line 3 and the voltage component $V_{32}$. Therefore, the solid curve $V_{32}$ in Fig. 2 illustrates this component of voltage under unity power factor conditions. It will be seen that the resultant control grid potential at the 90° point, which is the only point at which conduction may be initiated, is negative since it is equal to the instantaneous sum of $V_{28}$ plus $V_{32}$. Thus, tube 13 remains non-conductive. If the phase of the line current of circuit 3, however, becomes lagging, the phase of $V_{32}$ becomes correspondingly lagging until a point is reached as shown by the dashed curve $V_{32}$ where, due to a combination of phase shift and magnitude of current, the instantaneous control voltage becomes more positive than the critical grid voltage at the same time the peak excitation is on shield grid 17. Under this condition, the tube 13 "fires," conducting current for half the positive anode voltage cycle. It will be seen that the instantaneous value of the voltage component $V_{32}$, corresponding to the current of circuit 3, at the 90° point is proportional to $I \sin \delta$. This expression is also the value of the lagging reactive amperes so that when this voltage component reaches a predetermined, or preset value, sufficient to overcome the adjustable component of voltage $V_{28}$, it indicates that a certain lagging reactive current component is flowing.

Another way of visualizing the operation is to consider the sum of the voltage $V_{28}$ and $V_{32}$. This sum or resultant voltage is a sine wave since the two components $V_{28}$ and $V_{32}$ are sine waves. Under the conditions previously described, this resultant voltage leads the anode voltage of tube 13 ($V_{11'}$) by more than 90° at unity power factor conditions in circuit 3. As the phase of the line current is retarded, the phase of the resultant is retarded until at approximately 90° lead of the resultant, the tube 13 conducts. It will be seen that conduction of tube 13 occurs for any angle of resultant grid voltage from plus 90° to minus 90°.

Still another way to visualize the operation is to consider $V_{32}$ broken up into two components; one in phase with $V_{11'}$ (the anode voltage) and one 90° lagging. The in-phase component is zero at the instant that the peak $V_{43}$ occurs so that it has no effect on the "firing" of tube 13 regardless of the magnitude of the current vector. The other component is a maximum at this instant so that its peak value opposes the holdoff bias $V_{28}$ and firing of tube 13 occurs when the 90° lagging component reaches a predetermined value.

The operation of the electronic electroresponsive device 9 as a reactive current relay suitable for the application illustrated in Fig. 1 may be shown by the vector diagram of Fig. 4. The voltage vector $V_{11'}$ extending from point V horizontally to the right represents the anode voltage of tube 13. The adjustable bias $V_{28}$ is shown opposite in phase to $V_{11'}$. The current signal produces a voltage component adding vectorially on the end of $V_{28}$ extending vertically upward for unity power factor conditions due to the 90° phase shift given to the current signal component of voltage by means of the phase shift means 33. If the line current lags, this current voltage vector $V_{32}$ swings to the right an angle equal to the retard of the current. Whenever the current voltage vector $V_{32}$ intercepts a vertical line through the point V (the cathode potential) the resultant control grid voltage $V_{16}$ falls within the range of plus 90° through zero to minus 90° phase shift and the tube 13 is rendered conductive. As long as the end of the resultant grid voltage vector falls to the left of this line, the resultant grid phase is outside these limits and no conduction of tube 13 takes place. Therefore, this vertical line through the point V may be called the "trip axis," and if the terminus of the resultant grid voltage vector falls anywhere to the left of the axis no conduction results, and if it falls to the right conduction does result. In this diagram, the vectors I', I'' and I''' represent current vectors of different magnitude and phase which just cause tube 13 to conduct. It will be seen that any of these current vectors can be resolved into two components; an in-phase current component corresponding to the voltage components $V'_{32}$, $V''_{32}$ and $V'''_{32}$, and a lagging reactive current signal component $V'_{32}$—$V'_{16}$, $V''_{32}$—$V''_{16}$ and $V'''_{32}$—$V'''_{16}$. It is evident that the reactive component for tripping is always the same as long as the unity power factor and trip axes are parallel. Thus the electro-responsive device as adjusted for the above-described operation is a true indication of reactive amperes.

The operation of the electroresponsive device as a reactive current relay in controlling the circuit interrupter 7 is as follows: It will be assumed that the current of circuit 3 has assumed a current of magnitude and phase corresponding to I' of Fig. 4. Under this condition, tube 13 becomes conducting and coil 18 is energized to close contacts 19 and thereby the contacts 56 of relay 57 of the timing device 47. Before contacts 56 were closed, the capacitor 59 was kept in a charged condition through resistor 61 by grid current flow so that the capacitor terminal next to the grid 54 is negative and the tube is biased off. Upon closure of contacts 56, the anode-cathode circuit is closed and after a predetermined time, depending upon the time required for the capacitor charge to be reduced, the tube 52 will become conductive and energize coil 8 for closing the circuit interrupter 7. This places the capacitor bank in shunt relation with circuit 3 and effects the correction desired.

In order to prevent "pumping" of the control apparatus, it may be desirable to recalibrate the electronic electroresponsive device upon connection of the capacitor bank 7. This recalibration is effected by contacts 62 upon closure of circuit interrupter 7 so as to effect closure of contacts 25. This change impresses a component of voltage in the excitation circuit of grid 16 and may be made to reverse the voltage vector $V_{28}$ of Fig. 4 and thereby reduce the value of the component of reactive current which will permit valve 13 to become non-conductive and thereby disconnect the capacitor bank.

Some of the features of adjustment and also the feature of recalibration may be better understood by reference to Fig. 5 which is a simplified form of a relay polar diagram. The central vertical axis is taken as the current or unity power factor axis and the horizontal axis, by reason of the quadrature relation between current and voltage for unity power factor conditions assumed in Fig. 1, is shown as the voltage $V_{11'}$ corresponding to the phase voltage of circuit 3. It is obvious that by adjusting 28 in Fig. 1 which changes the magnitude of $V_{28}$, it is possible to adjust the position of the trip axis with respect to the unity power factor axis for any value of reactive amperes desired. The position of the vertical trip axis to the right of the unity power factor axis is determined by the setting of 28 to give the desired "pick up" for the electroresponsive device 9. The trip axis to the left of the central unity power factor axis is determined by the setting of resistor 21 by adjustable connection 23 which determines the relay characteristics once the relay operates and the interlocking contacts 25 are closed. As shown, this bias potential may actually be in phase with the anode voltage and result in moving the trip line to the other side of the origin. Thus, if the capacitor current of capacitor bank 6 passes through the current transformer 35 of circuit 3 (Fig. 1), it is possible to recalibrate the electronic relay 9 so as to tolerate even a certain leading reactive ampere component when the capacitor bank is first connected if necessary to prevent "pumping." If the time delay means 47 is omitted, it will of course be evident that the recalibration contacts 62 would be operated by the relay 18 rather than the final relay 8.

It will be apparent that without the recalibration scheme, the electronic electroresponsive device as described may be made to operate solely as a lagging current quadrature relay. However, it will also be apparent that by reversing the bias voltage $V_{28}$ to make it a positive "turn on" voltage rather than a "hold off" voltage, the relay would remain energized except when the leading current component of the line shifts $V_{32}$ so as to provide a voltage sufficient to overcome the "turn-on" effect of $V_{28}$. The electroresponsive device would then operate to effect a change in accordance with a predetermined leading current in the line and would function as a leading current quadrature relay.

From the foregoing disclosure, it will be apparent that the reactive current electroresponsive device 9 of Fig. 1 is only one specific form of my invention and that my invention in its broader aspects is capable of embodiment in a generalized form of electron tube current relay. For example, if the phase shifting means 33 is set so that the current voltage signal $V_{32}$ is in phase with the current (that is, zero phase shift) it is found that the unity power factor current signal axis and the tube trip axis are perpendicular. This means that the electronic electroresponsive apparatus is operative as a function of the in-phase component of current and, therefore, operates as a power responsive relay if the phase voltage of the line or anode of tube 13 remains fixed.

It will also be apparent that by using different values of phase shift in the phase shifting means 33, one may choose any desired angular relation between the unity power factor axis and the tripping axis. It will be noted that the particular angular relation of the tripping axis and the unity power factor axis when these axes intersect at the center of the polar diagram determines the 180° range of phase displacement between the current and voltage of the line for which conduction of the tube may be effected. It should be noted that the trip axis is always perpendicular to the anode voltage vector $V_{11'}$ as long as the voltage peak $V_{43}$ occurs at the 90° point of the anode-cathode voltage wave. Thus, the diagonal closing line identified as "150° lagging current" is obtained by adjusting the phase shift circuit 33 of Fig. 1 for 90° plus 60° to equal 150° lag or 30° lead. If the unity power factor axis is fixed as shown, the anode voltage vector $V_{11'}$ lags it by the angle of lead of the phase shift network 33. Thus when the phase shift network is adjusted for 180° lead, the horizontal closing line of a reverse power relay is obtained. In this case, the phase voltage is reversed with respect to the unity power factor axis so that the "off" operation can be effected above the horizontal tripping line and the "on" operation can be effected below the tripping line. From these observations it will be noted that the unity power factor current signal must always lead the anode voltage $V_{11'}$ by 90° plus $\alpha$ where $\alpha$ is the angle between the unity power factor axis and the closing line. The distance $d$ between the center of the polar diagram and the closing line is increased or decreased by increasing or decreasing the out-of-phase grid voltage $V_{28}$. If $d$ is considered positive when $V_{28}$ is out-of-phase such as the $d$ indicated for the reactive current relay, then $d'$ would be negative and indicate an in-phase grid bias $V_{28}$.

With the diagonal tripping axis and with the reverse power tripping axis and for any other angle of the tripping axis, it will be noted that the 180° range of phase displacement between the current and voltage of the line within which "on" or "off" action may be effected is different for each shift of the tripping axis. It will be apparent that by means of phase shifting means 33, it is possible to adjust the relay so that tube 13 becomes conductive or non-conductive within any 180° range of phase displacement between the current and voltage of the alternating current circuit. In the claims I have used the term "change the state of conductivity" to express a change in the action of the tube when the conditions are such that the tube is changed from a non-conductive state to a conductive state, or vice versa. By adjusting the magnitude of the bias by the adjustable connection 28 on resistance 26 (Fig. 1) it will be observed that the perpendicular distance $d$ between the tripping line and the origin for any phase position of the tripping line may be selected at any desired value. This variation of the perpendicular distance referred to increases or decreases the angular range of phase displacement between the two coexisting electrical quantities within which conduction or non-conduction may take place.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, an alternating current circuit, an electron tube of the gaseous type having anode-cathode and control electrode circuits connected to be energized from said alternating current circuit, means including an additional source of voltage connected to energize said control electrode circuit for permitting said tube to become conductive only at the same predetermined point in each successive half cycle of its anode voltage, and means responsive to a predetermined relation between two coexisting electrical quantities of said alternating current circuit and connected to energize said control electrode circuit for changing the state of conductivity of said tube only at said predetermined point.

2. In combination, an alternating current circuit, an electron tube of the gaseous type having anode-cathode and control electrode circuits, means for energizing said anode-cathode circuit in accordance with a voltage of said alternating current circuit, means for energizing said control electrode circuit to permit said tube to become conductive only at a predetermined point in each half cycle of anode voltage, and means for additionally energizing said control electrode circuit with a resultant voltage varying in phase and magnitude relative to said predetermined point in accordance with the voltage and current of said circuit for rendering said tube conductive for a predetermined relation between the voltage and current of said alternating current circuit.

3. In an electroresponsive device of the electronic type comprising an electron tube of the gaseous type having an anode, a cathode and a control electrode circuit, means for impressing an alternating voltage upon said anode and cathode, means for impressing in said control electrode circuit a component of alternating voltage having such a phase position and magnitude as to bias the potential of said control electrode below that value required to render said tube conductive, means for impressing in said control electrode circuit a sharply peaked component of voltage at a predetermined point in each positive half cycle of anode voltage and having such a value at the instant of said peak as to reduce the negative potential of said control electrode to such a value as to permit said tube to be rendered conductive, and means for impressing upon said control electrode a component of voltage variable in accordance with a condition to be controlled for causing conduction of said tube at the instant of said peak for a predetermined value of said condition existing at the time of said peak.

4. In combination with an alternating current circuit, an electron tube having an anode, a cathode and a control electrode circuit, means for impressing a voltage across the anode and cathode of said tube corresponding to a voltage of said alternating current circuit, means for introducing in said control electrode circuit a component of alternating voltage having such a magnitude and phase relative to the alternating voltage of said anode as to bias the potential of said control electrode below that value required to render said tube conductive, means for impressing in said control electrode circuit a sharply peaked component of voltage at a predetermined point in each positive half cycle of anode voltage and having such a value at the instant of said peak as to overcome the bias voltage in said control electrode circuit and permit said tube to be rendered conductive, means for deriving from the current of said alternating current circuit a component of voltage variable relative to the instant of said peak of voltage, and means for introducing said last component of voltage in said control electrode circuit for causing conduction of said tube at the instant of said peak of voltage for a predetermined relation between the current and voltage of said alternating current circuit.

5. In an electroresponsive device of the electronic type comprising an electron tube of the gaseous type having an anode, a cathode and first and second electrodes interposed between said cathode and anode, means for impressing an alternating voltage across said anode and cathode, means for impressing a voltage between said first electrode and said cathode which is the resultant of an alternating component of voltage reversed in phase relative to said anode voltage and a sharply peaked voltage of the same phase as said anode voltage and providing a peak of voltage at a predetermined point in each positive cycle of anode voltage of a magnitude greater than the maximum amplitude of said component of voltage of reversed phase, means for impressing a voltage between said second electrode and said cathode which is a resultant of a component of voltage reversed in phase relative to said anode voltage and a component of alternating voltage variable in phase and magnitude in accordance with a condition to be controlled for causing conduction of said tube at the instant of said peak when the resultant voltage on said second electrode attains that value of voltage required thereon to render said tube conductive.

6. In an electroresponsive device of the electronic type comprising an electron tube of the gaseous type having an anode, a cathode, a shield grid and a control grid, means for impressing an alternating voltage upon said anode and cathode, means for impressing upon said shield grid a voltage which is the resultant of an alternating voltage reversed in phase relative to said anode-cathode voltage and a sharply peaked voltage of the same phase as said anode voltage and providing a substantially instantaneous peak of voltage at a predetermined point in each positive half cycle of anode voltage sufficient to reduce the negative potential of said shield grid to a value sufficient to permit said tube to be rendered conductive at the instant of said peak, and means for impressing upon said control grid a voltage which is the resultant of an alternating voltage reversed in phase relative to said anode voltage and a component of voltage having a variation in magnitude and phase relative to said anode voltage such as to provide a resultant voltage on said control grid of a magnitude and phase sufficient to render said tube conductive at the instant of said peak for any phase position of said resultant voltage relative to said anode voltage between the range of quadrature lagging through zero to quadrature leading.

7. In combination, an alternating current circuit, an electron tube of the gaseous type having an anode, a cathode, a shield grid and a control grid, means for energizing the anode-cathode circuit of said tube from a voltage of said alternating current circuit, means for impressing in the shield grid-cathode circuit of said tube a component of voltage in phase opposition to said anode-cathode voltage, a peaking transformer provided with primary and secondary windings and having its secondary winding included in series relation in said shield grid-cathode circuit, means for energizing said primary winding from said alternating current circuit and for producing a sharp peak of voltage of the same phase and simultaneously with the maximum amplitude of said anode voltage, means for introducing a component of voltage in said control grid-cathode circuit reversed in phase relative to said anode-cathode voltage, a transformer provided with primary and secondary windings and having its secondary winding included in series relation in said control grid-cathode circuit, and means responsive to the current in said alternating current circuit for producing a component of voltage for energizing the primary winding of said second mentioned transformer.

8. In combination, an alternating current circuit, an alternating current relay comprising an electron tube of the gaseous type having an anode, a cathode and a control electrode, means for energizing the anode-cathode circuit of said tube from a voltage of said alternating current circuit, means for establishing a sharp peak of voltage in the circuit of said control electrode of a peak value sufficient to permit conduction of said tube only at a predetermined point in each half cycle of anode-cathode voltage, means for impressing a bias voltage on said control electrode, means for establishing a component of voltage corresponding to the current in said alternating current circuit and for impressing said component of voltage on said control electrode, and means for establishing an initial predetermined phase relation between said last mentioned component of voltage and the anode voltage of said tube so that said tube is in a predetermined state of conductivity for said initial phase relation and in a different state of conductivity for a predetermined departure from said initial phase relation.

9. In combination, an alternating current circuit, an electron tube connected to be energized from said circuit and having an anode, a cathode and a control electrode, means for deriving from said alternating current circuit a plurality of components of voltage each variable in accordance with a plurality of coexisting electrical quantities of said circuit, a control electrode circuit for applying said components of voltage to said control electrode, and means interposed in circuit with said control electrode for selectively impressing upon said control electrode said component of voltage which is the most negative of said plurality of components of voltage.

10. In combination, an alternating current circuit, an electron tube having an anode, a cathode and a control electrode, means connected to said circuit for impressing an alternating voltage across the anode and cathode of said tube, voltage means connected to said circuit for applying to said control electrode a component of voltage variable in accordance with a voltage of said circuit, current means connected to be responsive to a current of said circuit for applying a component of voltage variable in accordance with the current of said circuit, and a pair of unidirectional conductive devices connected respectively between said control electrode and each of said voltage and current means for selectively impressing upon said control electrode said component of voltage which is the more negative of the two components of voltage.

11. In combination, an alternating current circuit, an electron tube having an anode, a cathode and a control electrode, means connected to said circuit for impressing an alternating voltage across the anode and cathode of said tube, voltage means connected to said circuit for applying to said control electrode a component of voltage variable in accordance with a voltage of said circuit, current means connected to be responsive to a current of said circuit for applying a component of voltage variable in accordance with the current of said circuit, a pair of unidirectional conductive devices connected respectively between said control electrode and each of said voltage and current means for selectively impressing upon said control electrode said component of voltage which is the more negative of the two components of voltage, and a resistance connected in parallel relation with said unidirectional conductive device which is connected in circuit with said current means.

12. In combination, an alternating current circuit, an electron tube of the gaseous type having an anode, a cathode, and a control grid, a transformer having a primary winding connected to be energized from said alternating current circuit and having a secondary winding with first and second outside terminals and an intermediate tap, means for connecting the anode and cathode of said tube across said first terminal and said intermediate tap, a voltage divider connected across said second outside terminal and said intermediate tap, means for connecting said control grid to a point on said voltage divider, means for introducing in series relation with said last mentioned means a component of voltage variable in accordance with the current in said alternating current circuit, a unidirectional current conducting device being connected directly at the terminal of said control grid and poled so as to conduct current from said control grid to said cathode, means for connecting said control grid across said second outside terminal and said intermediate tap, voltage peaking means for introducing in series relation with the voltage of said last mentioned means a sharply peaked voltage having the instant of its peak in phase with the maximum amplitude of the anode-cathode voltage of said tube, and a unidirectional current conductive device being connected directly at the terminal of said control grid and poled to conduct current from said grid so that said grid shall be selectively energized in accordance with the most negative of the components of voltage in the grid-cathode circuit of said tube.

13. In combination, an alternating current circuit, an electron tube of the gaseous type having an anode, a cathode, a shield grid and a control grid, a transformer having a primary winding connected to be energized from said alternating current circuit and having a secondary winding with a first and second outside terminal and an intermediate tap, means for connecting the anode-cathode circuit of said tube across said first terminal and said intermediate tap, means for connecting said shield grid to said second outside terminal, a peaking transformer provided with primary and secondary windings and having its secondary winding connected in series relation with said shield grid, said primary winding being connected to be energized in accordance with the voltage across said anode and cathode, a voltage divider connected across said first and second outside terminals and including a resistance having an adjustable connection, means for interconnecting said adjustable connection and said control grid, a second voltage divider connected across said intermediate tap and said second outside terminal and including a resistance with an adjustable connection, means for interconnecting said control grid and said last mentioned adjustable connection, a transformer having primary and secondary windings with the secondary winding thereof connected in series relation with said control grid, a current transformer connected in said alternating current circuit, phase shifting means connected to be energized from said current transformer, and means for energizing the primary winding of said last mentioned transformer from said phase shifting means.

14. In combination, an alternating current circuit, a reactive current relay comprising an electron tube of the gaseous type having an anode, a cathode, and a control electrode, means for energizing the anode-cathode circuit of said tube from a voltage of said alternating current circuit, means for establishing a sharp peak of voltage in the circuit of said control electrode of a value sufficient to permit a change in the state of conduction of said tube only at the 90° point of each half cycle of anode-cathode voltage, means for impressing a bias voltage on said control electrode, means for establishing a component of voltage corresponding to the current in said alternating current circuit, and means for impressing said component of voltage on said control electrode so as to have a quadrature relation with respect to the anode-cathode voltage of said tube when the power factor of said alternating current circuit is unity and variable in magnitude and phase relative to said quadrature relation in accordance with the departure of said alternating current circuit from said unity power factor condition for changing the state of conduction of said tube at a predetermined value of reactive current in said alternating current circuit at the instant of said peak of voltage.

15. In combination, an alternating current circuit, a reactive current relay comprising an electron tube of the gaseous type having an anode, a cathode, a shield grid, and a control grid, means for energizing the anode-cathode circuit of said tube with an alternating voltage of said alternating current circuit, means for impressing upon said shield grid a voltage which is the resultant of an alternating voltage reversed in phase relative to said anode-cathode voltage and a sharply peaked voltage of the same phase as said anode voltage and providing a substantially instantaneous peak of voltage at the 90 degree lagging position in each positive half cycle of anode voltage sufficient to reduce the negative potential of said shield grid to a value sufficient to permit said tube to be rendered conductive by said control grid at the instant of said peak, means for impressing upon said control grid a voltage which is the resultant of an alternating voltage reversed in phase relative to said anode voltage and a component of voltage variable in magnitude and phase relative to said anode voltage and in accordance with the current in said alternating current circuit, and means for adjusting the phase of said last mentioned component of voltage so that the potential of said control grid is insufficient to render said tube conductive for unity power factor in said circuit and is sufficient to render said tube conductive at the peak voltage of said shield grid when the lagging power factor of said circuit exceeds a predetermined value.

16. In combination, an alternating current circuit, an electroresponsive device comprising an electron tube of the gaseous type having anode-cathode and control electrode circuits connected to be energized from said alternating current circuit, means including an additional source of voltage connected to energize said control electrode circuit for permitting said tube to become conductive only at a predetermined point in each half cycle of its anode voltage, means connected to energize said control electrode circuit in response to a predetermined relation between two coexisting electrical quantities of said alternating current circuit for changing the state of conductivity of said tube, and means for changing the calibration of said electroresponsive device thereafter to effect a change in the state of conductivity of said tube in response to a different predetermined relation between said two coexisting electrical quantities.

17. In combination, an alternating current circuit, a relay comprising an electron tube of the gaseous type having anode-cathode and control electrode circuits connected to be energized from said alternating current circuit, means including an additional source of voltage connected to said control electrode circuit for permitting said tube to become conductive only at a predetermined point in each half cycle of its anode voltage, means connected to energize said control electrode circuit in response to a predetermined value of reactive current in said alternating current circuit above a predetermined value for rendering said tube conductive, and means for thereafter changing the energization of said control electrode circuit to maintain said tube conductive below said predetermined value of reactive current.

18. In combination, an alternating current circuit, a relay comprising an electron tube of the gaseous type having anode-cathode and control electrode circuits, means for energizing said anode circuit from said alternating current circuit, means for energizing said control electrode circuit from said alternating current circuit for permitting said tube to be rendered conductive only at a predetermined point in each half cycle of anode voltage, a plurality of sources of voltage derived from said alternating current circuit, means for energizing said control electrode circuit from one of said derived sources of voltage for rendering said tube conductive for a predetermined relation between the current and voltage of said circuit, means for connecting said control electrode circuit for energization from said second derived source of voltage, and means operative upon conduction of said tube for controlling said last mentioned means.

19. In an electroresponsive device of the electronic type comprising an electron tube of the gaseous type having an anode-cathode circuit and a control electrode circuit arranged for alternating voltage energization, means for energizing said control electrode circuit to permit said tube to become conductive only at the same predetermined point in each successive half cycle of the voltage of its anode-cathode circuit, means for impressing upon said control electrode circuit components of voltage corresponding to two coexisting electrical quantities, and means for adjusting said last mentioned means for rendering said tube conductive at said predetermined point within any desired angular range of phase displacement between said two coexisting quantities.

20. In an electroresponsive device of the electronic type comprising an electron tube of the gaseous type having an anode-cathode circuit and a control electrode circuit arranged for alternating voltage energization, means for energizing said control electrode circuit to permit said tube to become conductive only at the same predetermined point in each successive half cycle of the voltage of its anode-cathode circuit, means for impressing upon said control electrode circuit components of voltage corresponding to two coexisting electrical quantities for rendering said tube conductive at said predetermined point when a predetermined relation exists between said quantities, means for adjusting the magnitude of one of said components of voltage, and means for maintaining said one of said components of voltage constant for any given adjustment of said last mentioned means.

21. In an electroresponsive device of the electronic type comprising an electron tube of the gaseous type having anode-cathode and control electrode circuits arranged for alternating voltage energization, means for energizing said control electrode circuit to permit said tube to become conductive only at the same predetermined point in each successive half cycle of the voltage of its anode-cathode circuit, means for impressing upon said control electrode circuit components of voltage corresponding to two coexisting electrical quantities for controlling the conductivity of said tube, and means for adjusting said last mentioned means for rendering said tube conductive at said predetermined point within any 180 degree range of phase displacement between said two coexisting quantities.

22. In an electroresponsive device of the electronic type comprising an electron tube of the gaseous type having anode-cathode and control electrode circuits arranged for alternating voltage energization, means for energizing said control electrode circuit to permit said tube to become conductive only at the same predetermined point in each successive half cycle of voltage of its anode-cathode circuit, means for impressing upon said control electrode circuit components of voltage corresponding to two coexisting electrical quantities for controlling the conductivity of said tube, means for adjusting said last mentioned means for rendering said tube conductive at said predetermined point within any angular range of phase displacement between said two coexisting quantities, and means for increasing or decreasing said angular range of phase displacement.

23. In combination, an alternating current circuit, an electron tube having anode-cathode and control electrode circuits, means for energizing said anode-cathode circuit from said alternating current circuit, means connected to be energized from said alternating current circuit for producing a sharply peaked voltage in said control electrode circuit so as to permit said tube to become conductive only at a predetermined point in each positive half cycle of the anode-cathode voltage, means connected to be energized from said alternating current circuit for impressing upon said control electrode circuit a component of voltage corresponding to a voltage of said alternating current circuit and a component of voltage corresponding to a current of said alternating current circuit, and means for adjusting the phase of said current component of voltage relative to said voltage component of voltage for rendering said tube conductive within any desired angular range of phase displacement between the current and voltage of said alternating current circuit.

24. In combination, an alternating current circuit, an electron tube having anode-cathode and control electrode circuits, means for energizing said anode-cathode circuit from said alternating current circuit, means connected to be energized from said alternating current circuit for producing a sharply peaked voltage in said control electrode circuit so as to permit said tube to become conductive only at a predetermined point in each positive half cycle of the anode-cathode voltage, means connected to be energized from said alternating current circuit for impressing upon said control electrode circuit a component of voltage corresponding to a voltage of said alternating current circuit and a component of voltage corresponding to a current of said alternating current circuit, means for establishing a predetermined phase relation between said components of voltage for rendering said tube conductive over a predetermined 180 degree range of phase displacement between the current and voltage of said alternating current circuit, and means connected in said control electrode circuit for increasing or decreasing said 180 degree range.

25. Apparatus including an electric valve having an anode, a cathode and a control electrode, a source of voltage connected to the anode-cathode circuit of said valve, means connected to energize the control electrode-cathode circuit of said valve including a source of negative bias voltage, a source of control voltage and a resistance element, and additional means connected to energize said control electrode-cathode circuit including a unidirectional current conducting device, a second source of control voltage and a second source of bias voltage connected in circuit with said first mentioned source of control voltage and said resistance element, said second source of bias voltage and said unidirectional current conducting device being poled to conduct current through said resistance element in a direction to apply a negative voltage to the control electrode of said electric valve.

ORRIN W. LIVINGSTON.